US006926367B2

(12) United States Patent
Tomimatsu (10) Patent No.: US 6,926,367 B2
(45) Date of Patent: Aug. 9, 2005

(54) CAR SEAT WITH SEAT BELT WARNING MECHANISM

(75) Inventor: Kazunori Tomimatsu, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/724,880

(22) Filed: Dec. 2, 2003

(65) Prior Publication Data
US 2004/0160106 A1 Aug. 19, 2004

(30) Foreign Application Priority Data

Dec. 2, 2002 (JP) ...................................... 2002-350286

(51) Int. Cl.⁷ .............................................. B60R 22/00
(52) U.S. Cl. ..................... 297/468; 297/408; 297/284.1
(58) Field of Search .............................. 297/468, 217.3, 297/216.12, 408, 403, 284.1–284; 340/457.1; 180/286, 268

(56) References Cited

U.S. PATENT DOCUMENTS

| | | | | |
|---|---|---|---|---|
| 3,269,483 A | * | 8/1966 | Garner, Jr. ................. | 180/269 |
| 3,742,448 A | * | 6/1973 | Motz .......................... | 180/270 |
| 3,840,849 A | * | 10/1974 | Lohr ......................... | 340/457.1 |
| 3,874,474 A | * | 4/1975 | Quantz ....................... | 180/270 |
| 5,260,684 A | * | 11/1993 | Metzmaker ............... | 340/457.1 |
| 5,669,668 A | * | 9/1997 | Leuchtmann ................ | 297/408 |
| 2003/0098194 A1 | * | 5/2003 | Roddy ......................... | 180/270 |

FOREIGN PATENT DOCUMENTS

JP         10-236279 A      9/1998

* cited by examiner

Primary Examiner—Peter M. Cuomo
Assistant Examiner—Stephen D'Adamo
(74) Attorney, Agent, or Firm—Foley & Lardner LLP (57) ABSTRACT

A car seat is provided with a detector for detecting whether a seat belt is buckled or unbuckled and a deformation mechanism for partial deformation of the car seat. The partial deformation is held when an ignition switch of a car engine is switched on and the detector detects the seat belt is unbuckled. The partial deformation is canceled when the detector detects the seat belt is buckled. The deformation mechanism displaces at least one element out of a headrest, a seatback and a seat cushion of the car seat so as to partially deform the car seat.

9 Claims, 11 Drawing Sheets

CAR SEAT WITH SEAT BELT WARNING MECHANISM

BACKGROUND OF THE INVENTION

1. Field of the Invention

The present invention relates to a car seat with a seat belt warning mechanism for giving warning to an occupant when the seat belt is unbuckled.

2. Description of the Related Art

A vehicle is usually provided with a seat belt warning device such as a warning lamp for giving warning an occupant to buckle a seat belt. The occupant often misses the warning lamp and fails to buckle the seat belt because the warning lamp is located in an obscure place.

Japanese Patent Application Laid-Open H10-236279 discloses a warning indicator located in a noticeable place such as on a dashboard or on a roof. Such locations are noticeable even from an outside of the vehicle thereby a people around the vehicle notice that the occupant fails to buckle the seat belt. The occupant is forced to buckle the seat belt.

SUMMARY OF THE INVENTION

According to the related art, if the indicator is located outside of the vehicle, the inside occupant hardly notices the warning. In contrast, if the indicator is located inside of the vehicle, the indicator is not enough noticeable.

The present invention is intended for providing a car seat with a warning device to effectively give warning to an occupant when the seat belt is not buckled.

According to the present invention, a car seat is provided with a detector for detecting whether a seat belt is buckled or unbuckled and a deformation mechanism for partial deformation of the car seat. The partial deformation is held when an ignition switch of a car engine is switched on and the detector detects the seat belt is unbuckled. The partial deformation is canceled when the detector detects the seat belt is buckled. The deformation mechanism displaces at least one element out of a headrest, a seatback and a seat cushion of the car seat so as to partially deform the car seat.

The car seat is partially deformed by the deformation mechanism so that an occupant has to sit on the car seat in an irregular position as long as he does not buckle the seat belt. He has to buckle the seat belt to get a regular position. Thus the car seat of the present invention effectively gives warning to the occupant.

In contrast, in a case where the occupant is forced to urgently start the car, he can switch on the ignition switch and start the car without buckling the seat belt, if he stands the irregular position.

DETAILED DESCRIPTION OF THE PREFERRED EMBODIMENT

A first embodiment of the present invention will be described hereinafter with reference to FIGS. 1–5.

Figure 1:
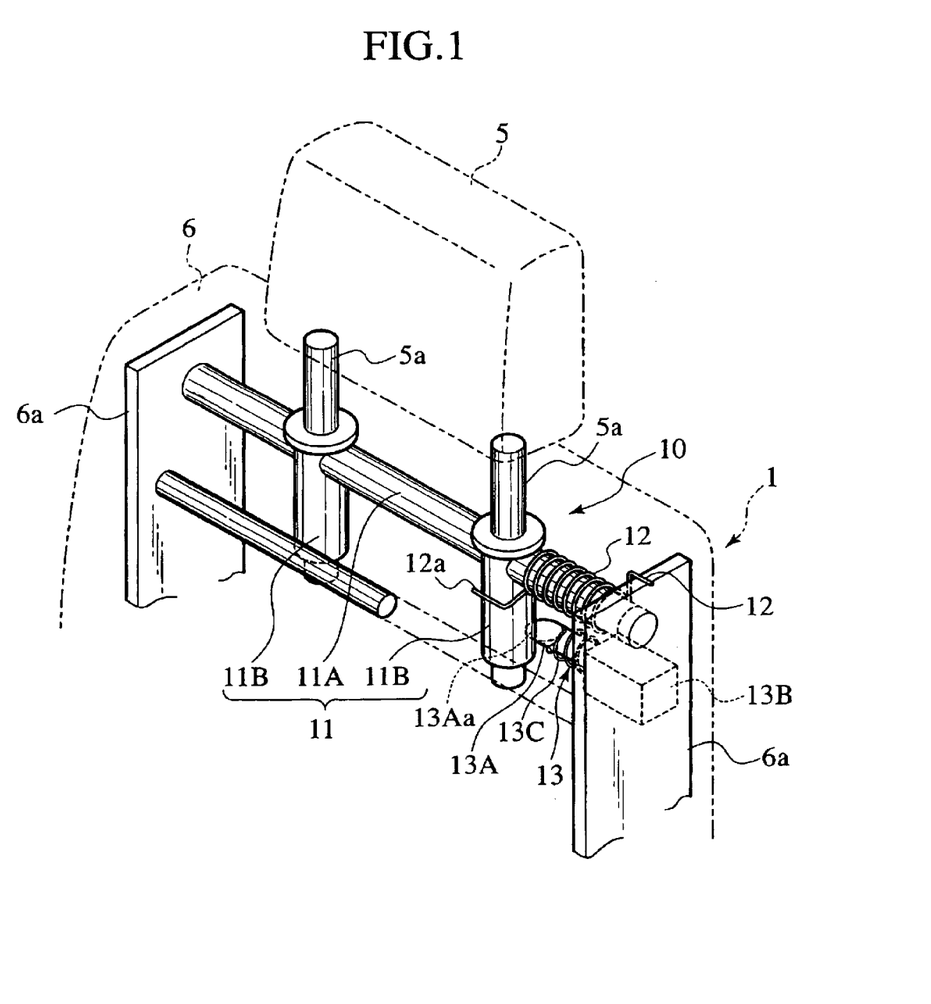
FIG. 1 is a perspective, partly transparent, view of a certain part of a car seat according to a first embodiment of the present invention.
Figure 3:
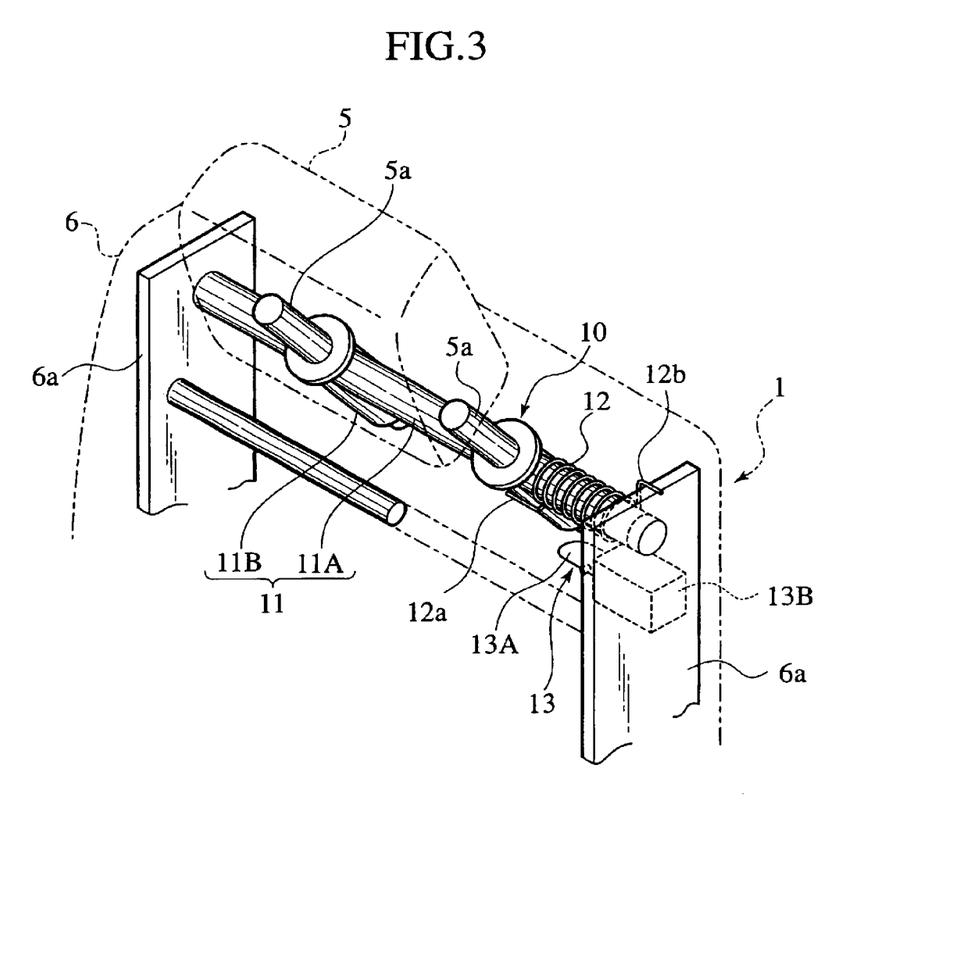
FIG. 3 is a perspective view of a certain part of the car seat showing an operation of the stopper mechanism.
Figure 4:
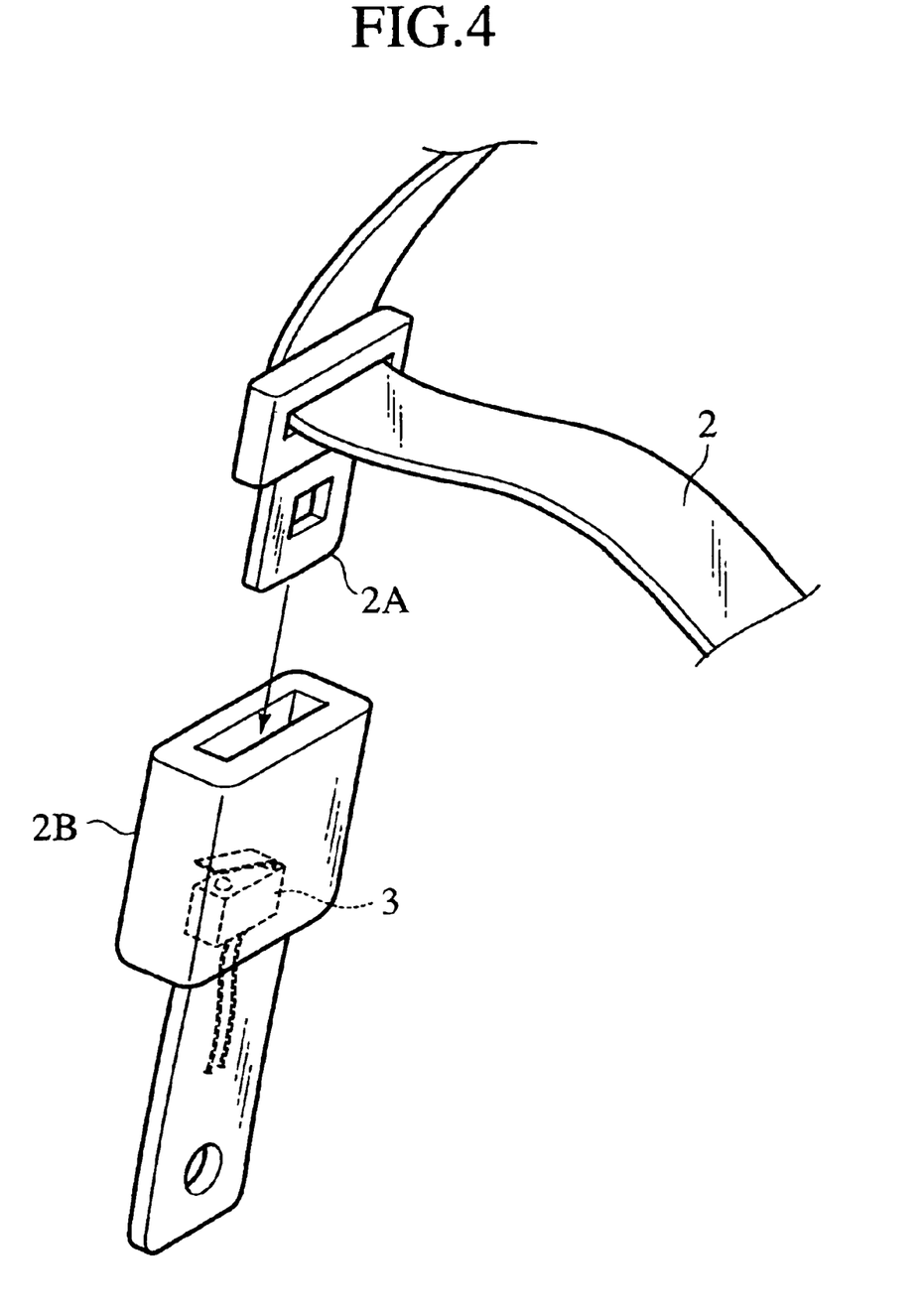
FIG. 4 is a perspective view of a certain part of a seat belt and a buckle according to a first embodiment of the present invention.
Figure 5:
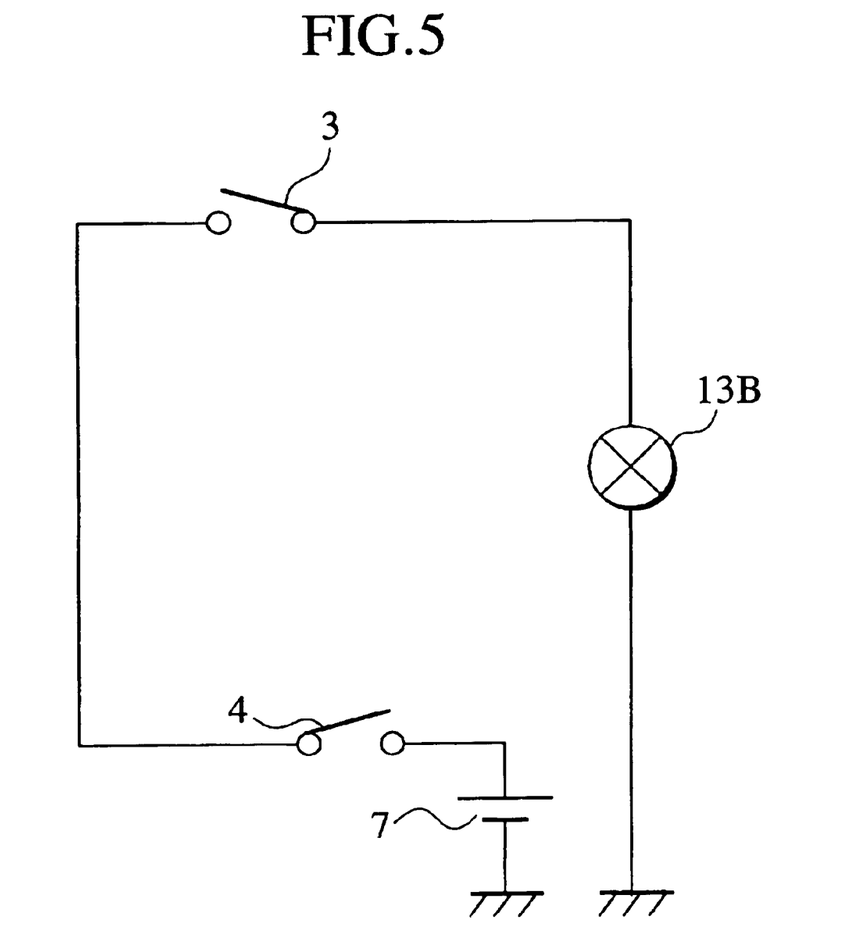
FIG. 5 is a circuit diagram of an operation of the stopper mechanism.

A car seat 1 of the first embodiment of the present invention is provided with a buckle switch 3 shown in FIG. 4, an ignition switch 4 shown in FIG. 5 and a headrest forward tilting mechanism 10 shown in FIG. 1. The headrest forward tilting mechanism 10 is a deformation means for displacing a headrest 5 so as to give warning to an occupant (not shown in FIGS. 1–4) when the occupant does not buckle the seat belt. The buckle switch 3 is a detection means for detecting whether a seat belt 2 is buckled. When the buckle switch 3 detects that the seat belt 2 is not buckled though the occupant sits on the car seat 1 in a case where the ignition switch 4 is ON, the headrest forward tilting mechanism 10 presses the occupant as the warning.

The headrest forward tilting mechanism 10 is provided with a support portion 11 for supporting the headrest 5, a spring 12 for applying a force to the headrest 5 to be tilted forward and a stopper mechanism 13. The stopper mechanism 13 holds the headrest 5 to be a regular position shown in FIG. 1 in a normal state and allows the headrest 5 to be tilted forward when the seat belt 2 is not buckled.

The support portion 11 is provided with a rotation shaft 11A rotatably supported by a pair of seat frames 6a of a seatback 6, a pair of stay holder 11B fixed to the rotation shaft 11A and a pair of stays 5a respectively fixed to the stay holder 11B. A lower end of the headrest 5 is detachably attached to the stays 5a.

The spring 12 is fitted around the rotation shaft 11A. One end 12a of the spring 12 is latched to the stay holder 11B and the other end 12b is latched to the seat frame 6a in a state that the spring 12 applies a force to the headrest 5 so as to be tilted forward.

Figure 2:
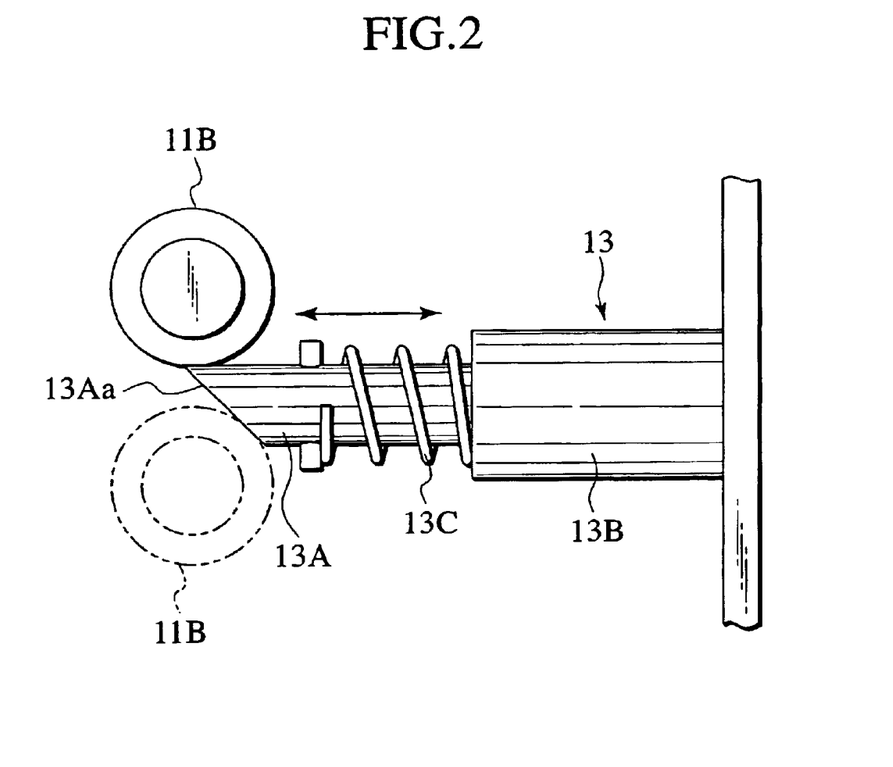
FIG. 2 is a top plan view of a stopper mechanism and a stay holder of the car seat of the first embodiment.

The stopper mechanism 13 essentially consists of a stopper 13A shaped bar-like, a solenoid 13B for driving the stopper 13A so as to be ejected and retracted and a spring 13C for applying a force to the stopper 13A so as to be ejected as shown in FIG. 2. The solenoid 13B retracts the stopper 13A against the force of spring 12 when current is sent to the solenoid 13B, and the stopper 13A is ejected by the force of the spring 13 when the current is switched off.

An end portion of the stopper 13A is engaged with a rear side of the stay holder 13B so as to hold the stay holder 11B at a regular position when the stopper 13A is ejected. The end portion of the stopper 13A is separated from the stay holder 13B so that the headrest 5 is tilted forward with the rotation shaft 11A as an axis as shown in FIG. 3 when the stopper 13A is retracted.

A slanted surface 13Aa is formed at a rear side of the end portion of the stopper 13A. When a front side of the stay holder 11B abuts the slanted surface 13Aa, the stay holder 11B slides on the slanted surface 13Aa so as to retract the stopper 13A. When the stay holder 11B is further pressed to the slanted surface 13Aa, the stay holder 11B goes over the stopper 13A and the stopper 13A is ejected again as shown in FIG. 2. Thereby, when the headrest 5 is tilted forward and the stopper 13A is ejected as shown in FIG. 3, pressing the headrest 5 rearward results the stopper 13A to be retracted and ejected again so that the headrest 5 moves to the regular position and is held by the stopper 13A.

The buckle switch 3 is provided for detecting whether the seat belt 2 is buckled or unbuckled. The buckle switch 3 shown in FIG. 4 is operated by insertion and extraction of a tongue 2A of the seat belt 2 to a buckle 2B. The buckle switch 3 is ON when the tongue 2A is extracted from the buckle 2B, and the buckle switch 3 is OFF when the tongue 2A is inserted.

The buckle switch 3 is connected with a battery 7 and the ignition switch 4 in series. When the ignition switch 4 is switched ON though the seat belt 2 is not buckled, both the ignition switch 4 and the buckle switch 3 are switched ON so that current is applied to the solenoid 13B of the stopper mechanism 13 so as to retract the stopper 13A.

In contrast, when the seat belt 2 is buckled, if the ignition switch 4 is switched ON, the buckle switch 3 is OFF though the ignition switch is ON. Thereby the current to the solenoid 13B is switched off so as to eject the stopper 13A.

According to the car seat 1 of the aforementioned first embodiment, if an occupant switches the ignition switch 4 ON though the seat belt 2 is not buckled, the headrest 5 is tilted forward so as to give warning to the occupant.

He has to buckle the seat belt 2 to get a regular position. When he buckles the seat belt 2 so that the buckle switch 3 is OFF and the stopper 13A is ejected, he can press the headrest 5 rearward with his head so that the headrest 5 is restored to the regular position.

An application of the car seat 1 of the first embodiment is not limited to a driver's seat. The car seat 1 can be applied to either a front passenger seat or rear seats.

According to the first embodiment of the present invention, the car seat 1 effectively gives warning to the occupant to buckle the seat belt 2 though the warning is not so severe. In a case where the occupant is forced to urgently start the car, he can start the car without buckling the seat belt 2, if he stands the irregular position.

Furthermore, the headrest forward tilting mechanism 10 is simply composed, thereby the car seat 1 needs not have a complex structure.

Figure 6:
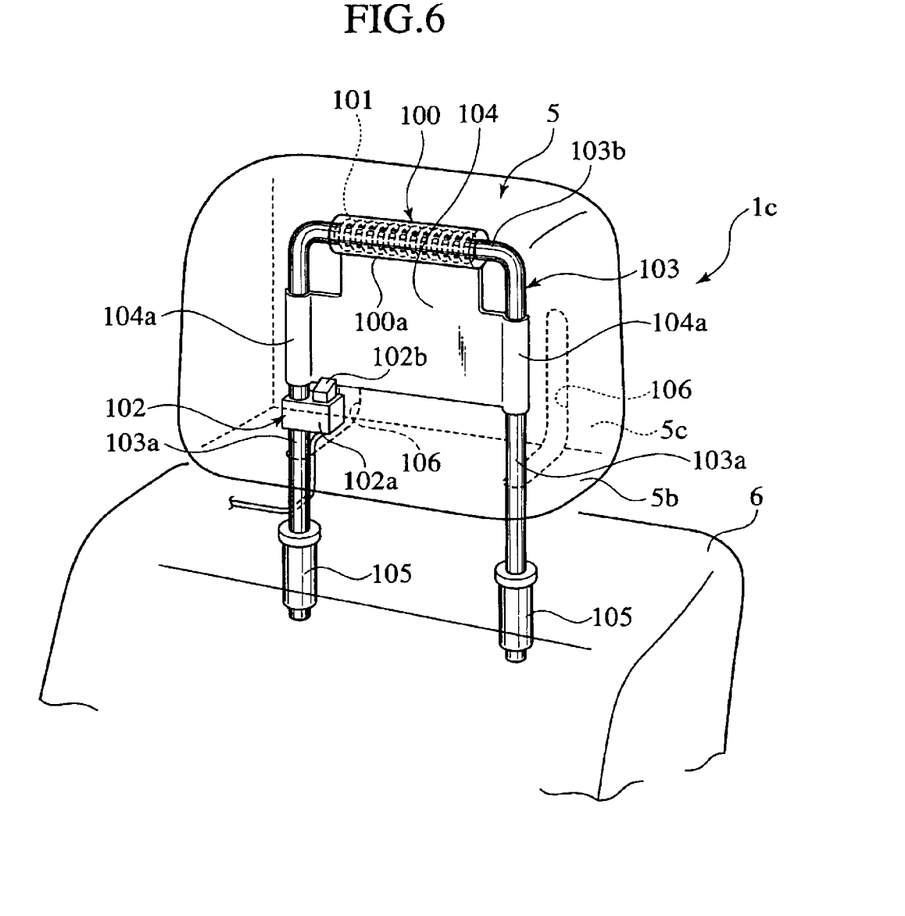
FIG. 6 is a perspective, partly transparent, view of a headrest according to a second embodiment of the present invention.

A second embodiment of the present invention will be described hereinafter with reference to FIGS. 6–8. In the following description, the same elements as the above first embodiment are referenced with the same numerals and the detailed descriptions are omitted. Mainly differences are described below.

A car seat 1c of the second embodiment is provided with a support portion 100 for supporting the headrest 5, a spring 101 for applying a force to the headrest 5 via the support portion 100 and a stopper mechanism 102. Differently from the aforementioned first embodiment, the applied force tilts the headrest 5 backward.

Meanwhile, in the description of the second embodiment, "the headrest 5 is tilted backward around the support portion 100" means "a lower half of the headrest 5 is projected forward".

A core member 103 is formed in an inverted U-letter shape and therefore provided with a pair of vertical portions 103a and a horizontal portion 103b. A cylinder portion 100a of the support portion 100, to which a flame 104 is integrally fixed in a hanging manner, is rotatably fit around the horizontal portion 103b and the spring 101 is inserted therebetween so as to give the force to the support portion 100. A stopper mechanism 102 is fixed to one of the vertical portions 103a and disposed in the vicinity of the flame 104. The support portion 100, the spring 101, the stopper mechanism 102 and the flame 104 are housed in the headrest 5. The pair of vertical portions 103a of the core member 103 are respectively inserted into a pair of holders 105 which are fixed in the seat frame 6a. An exterior material 105b and a cushion material 5c of the headrest 5 are provided with a pair of slits 106 so as to allow the vertical portions 103a passing therethrough. Thereby the headrest 5 can be tilted backward.

The flame 104 is further provided with a pair of holding portions 104a formed in a half cylinder shape. The holding portions 104a are formed so as to respectively fit with the vertical portion 103a and function as a stopper for restricting a rotation of the headrest 5.

The stopper mechanism 102 is provided with a stopper 102b which is retractable into the stopper mechanism 102 and urged so as to be ejected by means of a spring (not shown) installed therein.

The stopper mechanism 102 is further provided with a solenoid (not shown) installed therein. In a case where current is applied on the solenoid, the stopper 102b is retracted against a force of the spring. In a case where the current is switched off, the stopper 102b is ejected. When ejected from the stopper mechanism 102, the stopper 102b is engaged with the flame 104 so that the headrest 5 is prevented from tilting backward. When retracted into the stopper mechanism 102, the headrest 5 is free from the stopper 102b so as to tilt backward.

The current is switched by means of the buckle switch 3 and the ignition switch 4, like as the aforementioned first embodiment. When the ignition switch 4 is switched ON though the seat belt 2 is not buckled, both the ignition switch 4 and the buckle switch 3 are switched ON so that current is applied to the solenoid of the stopper mechanism 102 so as to retract the stopper 102b. In contrast, when the seat belt 2 is buckled, if the ignition switch 4 is switched ON, the buckle switch 3 is OFF though the ignition switch is ON. Thereby the current to the solenoid is switched off so as to eject the stopper 102b.

Figure 7A:
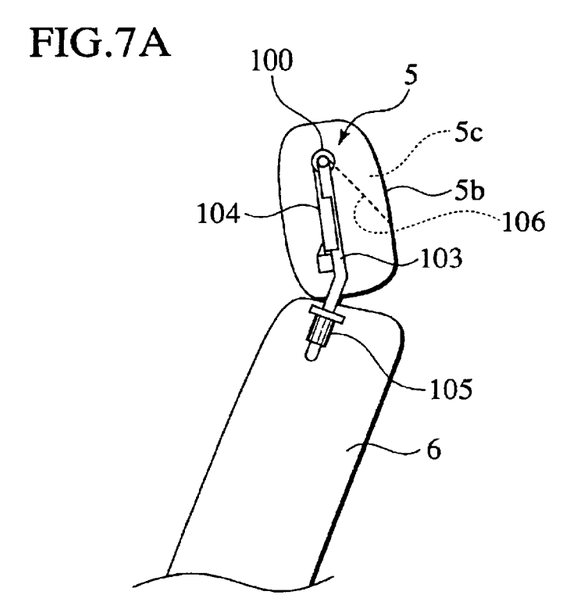
FIG. 7A is a side view of the headrest according to the second embodiment showing a regular position thereof.

In a steady state, the stopper 102b is engaged with the flame 104 so that the headrest 5 is prevented from tilting backward as shown in FIG. 7A. In a case where the ignition switch 4 is switched ON though the seat belt 2 is not buckled, the stopper 102b is retracted so that the headrest 5 is tilted backward as shown in FIG. 7B.

Figure 7B:
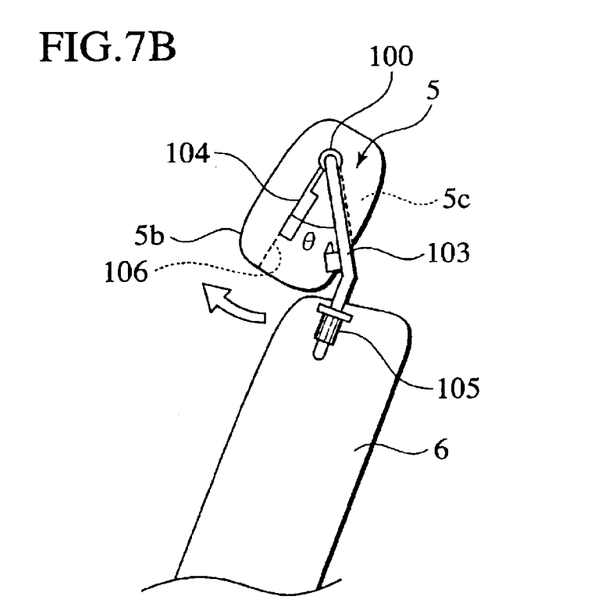
FIG. 7B is a side view of the headrest according to the second embodiment showing a tilted position.

Of course, in a case where the headrest 5 is tilted backward though the seat belt 2 is buckled, the headrest 5 can be back to a regular position as shown in FIG. 7B by means of pressing the headrest 5 backward. The flame 104 can easily overcome the stopper 102b against the force applied by the spring.

A tilt angle θ of the headrest 5 is restricted by abutment of the core member 103 with a back end of the slit 106 as shown in FIG. 7B.

Figure 8:
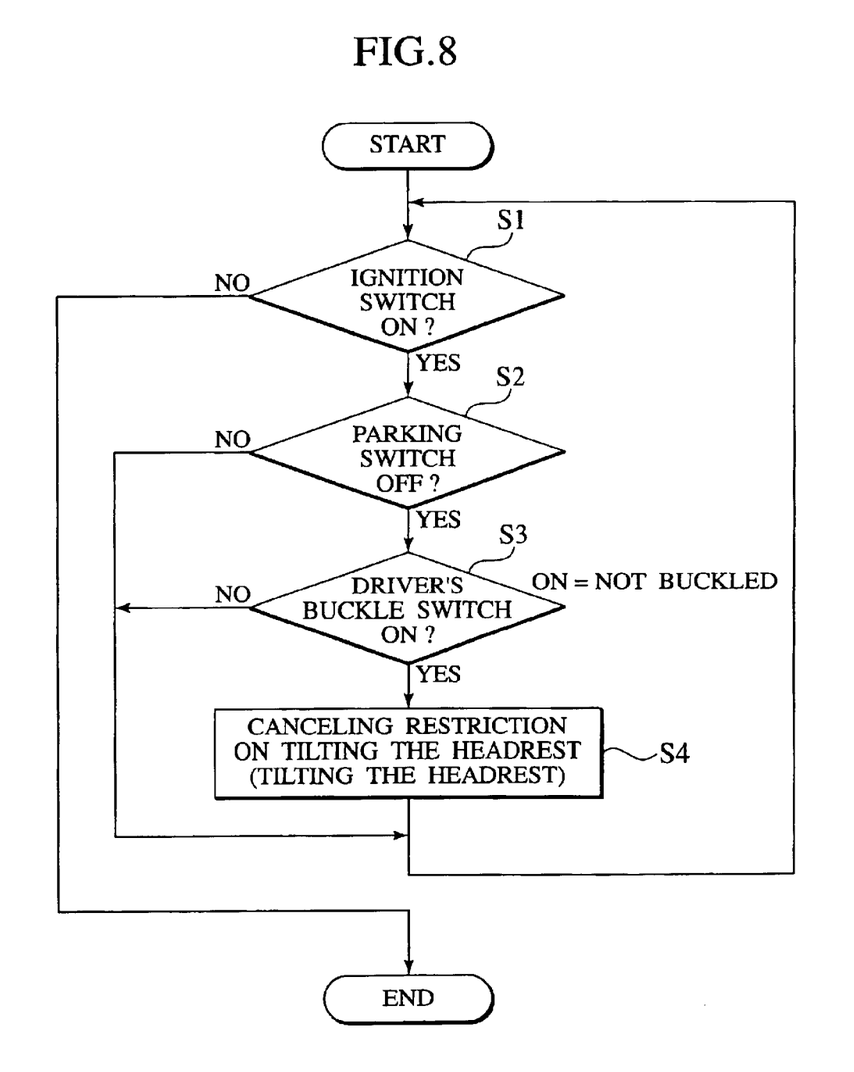
FIG. 8 is a flowchart describing a control of a tilt mechanism of the headrest.

The control of the stopper mechanism 102 can be schematically shown as a flow chart of FIG. 8. Provided that the ignition switch 4 is ON (judged at a step S1), a parking switch is OFF (judged at a step S2) and the buckle switch 3 is ON (judged at a step S3) caused by not buckling the seat belt 2, the stopper mechanism 102 is canceled so as to tilt the headrest 5 backward at a step S4. Then the occupant is given warning.

Meanwhile, in a case where the ignition switch 4 is judged to be OFF at the step S1, the control is terminated. In a case where the parking switch is judged to be ON at the step S2 or the buckle switch 3 is judged to be OFF at the step S3, the control is made back to the step S1 and this series of the steps are re-achieved.

As will be understood from the above description, the car seat 1c of the second embodiment effectively gives warning to the occupant to buckle the seat belt 2 though the warning is not severe, similarly to the first embodiment. The occupant can press the headrest 5 with his head so that the headrest 5 is restored to the regular position. Of course, in a case where the occupant is forced to urgently start the car, he can start the car without buckling the seatbelt 2, if he stands the irregular position.

Furthermore, the functional members such as the support portion 100, the spring 101 and the stopper mechanism 102 are housed in the headrest 5. Thereby the composition of the headrest 5 does not influence the structure of the seatback 6. The present embodiment of the present invention can be applied to a commonly structured seatback.

Furthermore, the headrest 5 can be simply composed and needs not have a complex structure.

A third embodiment of the present invention will be described hereinafter with reference to FIGS. 9 and 10. In the following description, the same elements as the above first embodiment are referenced with the same numerals and the detailed descriptions are omitted. Mainly differences are described below.

Figure 9:
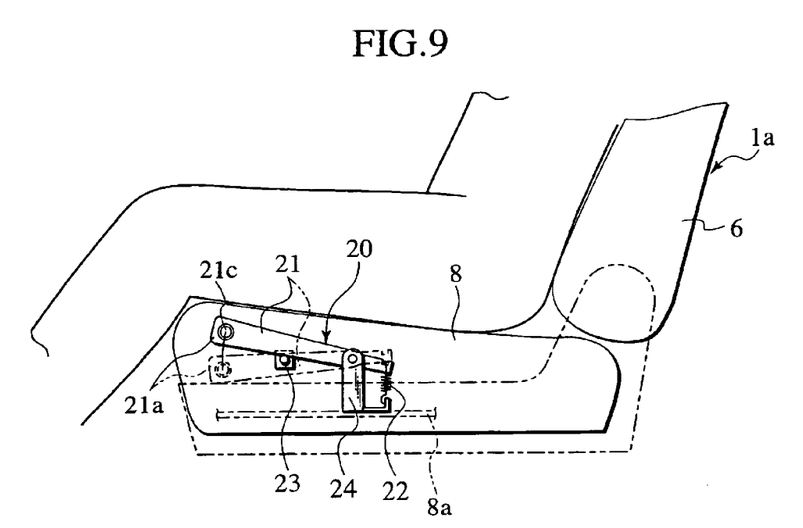
FIG. 9 is a side, partly transparent, view of a car seat according to a third embodiment of the present invention.
Figure 10:
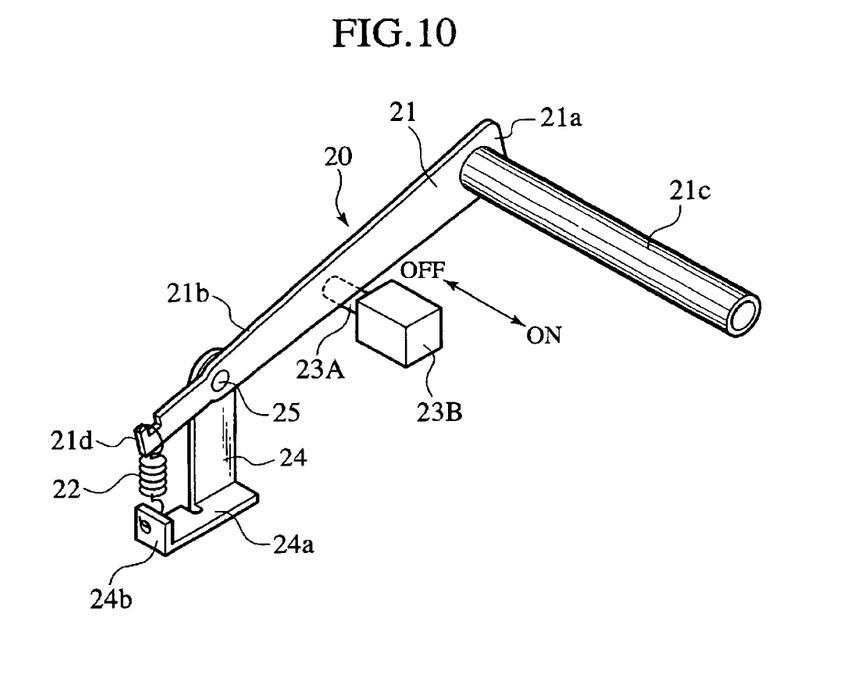
FIG. 10 is a perspective view of a cushion lifting mechanism according to a third embodiment of the present invention.

A car seat 1a of the third embodiment is provided with a cushion lifting mechanism 20 for lifting a front portion of a seat cushion 8 as a deformation means for displacing a seat cushion 8 so as to give warning to an occupant as shown in FIGS. 9 and 10.

The cushion lifting mechanism 20 is provided with a pair of swinging members 21 housed in the seat cushion 8, springs 22 for respectively giving an upward force to the swinging members 21 and a stopper mechanism 23. The swinging members 21 are rotatably supported on a pan frame 8a so that a front end portion 21a thereof is allowed to be swing up and down. The stopper mechanism 23 holds the swinging members 21 in a lower position when the seat belt is not buckled. The stopper mechanism 23 cancels holding and allows the swinging members 21 to swing upward when the seat belt is buckled.

The swinging members 21 are formed in pair and symmetrically provided at both sides in the seat cushion 8. Rear end portions 21b thereof are rotatably supported by brackets 24 fixed to the pan frame 8a with pins 25 so that the swinging members 21 can swing up and down. The pair of swinging members 21 are connected by a connection bar 21c at the front end portions 21a.

The swinging members 21 can swing upward as shown in full lines in FIG. 9 so that the front end portion of the seat cushion 8 is lifted and femoral regions of the occupant is pressed upward. In contrast, the swinging members 21 can also swing downward as shown in broken lines in FIG. 9 so that the front end portion of the seat cushion 8 can be pushed down and he can get a normal seating position.

The brackets 24 are fixed to the pan frame 8a via respective flanges 24a and each of the flanges 24a is provided with a lower latch 24b as shown in FIG. 10. Each of the rear end portions 21b is further extended rearward and an end thereof is provided with an upper latch 21d. The springs 22 are respectively latched between the lower latches 24b and the upper latches 21d so as to apply a force to the swinging members 21, thereby the front end portions 21a of the swinging members 21 are urged to swing upward.

The stopper mechanism 23 essentially consists of a stopper 23A shaped bar-like and a solenoid 23B for driving the stopper 23A so as to be ejected and retracted. The solenoid 23B retracts the stopper 23A when current is switched ON, and ejects the stopper 23A when the current is switched OFF.

An end portion of the stopper 23A is engaged with a lower side of the swinging member 21 so as to hold the swinging members 21 at an upper position when the stopper 23A is ejected. The swinging members 21 can swing downward as shown in FIG. 9 when the end portion of the stopper 23A is retracted.

A vertical width of the swinging member 21 accommodated with the stopper 23A is broader than a swinging range thereof so that the stopper 23A abuts the swinging member 21 so as not to be ejected when the swinging member 21 swings downward.

A buckle switch of the third embodiment (not shown in the drawings) is also operated by the seat belt. The buckle switch is ON when the seat belt is buckled, though the buckle switch is OFF when the seat belt is unbuckled.

According to the car seat 1a of the third embodiment, the front portion of the seat cushion 8 is lifted by the force of the spring 22 as shown in full lines in FIG. 9 and the stopper 23A is engaged with the lower side of the swinging member 21 before the occupant takes the seat.

If the occupant might switch the ignition switch ON though the seat belt was not buckled, the stopper 23A was kept engaging with the lower side of the swinging member 21 so as to give warning to the occupant.

He has to buckle the seat belt to get a normal seating position. When he buckles the seat belt so that the buckle switch is OFF and the stopper 23A is retracted, he can press the seat cushion 8 downward with his femoral regions so that the seat cushion 8 recovers to a regular position.

A fourth embodiment of the present invention will be described hereinafter with reference to FIGS. 11A and 11B. In the following description, the same elements as the above first through third embodiments are referenced with the same numerals and the detailed descriptions are omitted. Mainly differences are described below.

Figure 11A:
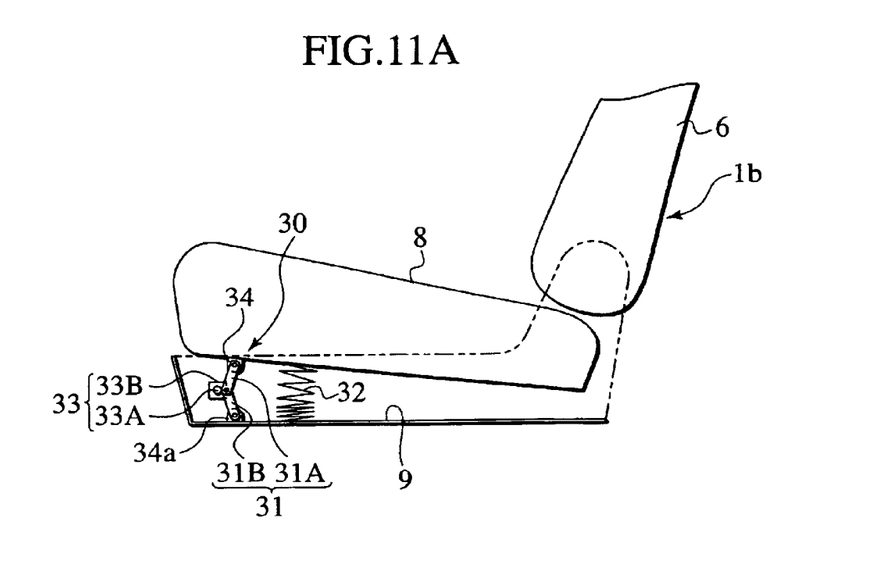
FIG. 11A is a side, partly transparent, view of a certain part of a car seat according to a fourth embodiment of the present invention, showing a stopper mechanism holding a cushion seat to be lifted.
Figure 11B:
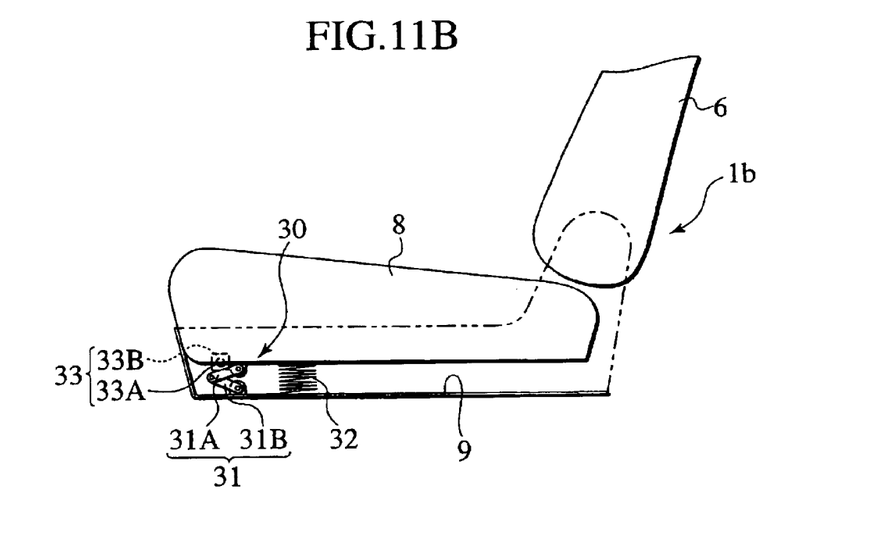
FIG. 11B is a perspective, partly transparent, view of a certain part of the car seat showing the stopper mechanism canceling holding.

A car seat 1b of the fourth embodiment is provided with a cushion lifting mechanism 30, a linkage 31, a spring 32 and a stopper mechanism 33 as shown in FIGS. 11A and 11B. The cushion lifting mechanism 30 is provided for lifting a front portion of a seat cushion 8 as a deformation means for displacing the seat cushion 8 so as to give warning to an occupant. The linkage 31 is provided between a front portion of the seat cushion 8 and a lower cover 9 so as to able to shrink and expand. The spring 32 is provided for applying an upward force to the seat cushion 8. The stopper mechanism 33 holds the linkage 31 to expand when the seat belt is not buckled and cancels holding the linkage 31 so as to shrink when the seat belt is buckled.

The linkage 31 is provided with a first link 31A rotatably fixed to a lower side of the seat cushion 8 and a second link 31B rotatably fixed to the lower cover 9 via a bracket 34a, and the first link 31A and the second link 31B is rotatably connected at a node so that the linkage 31 can shrink and expand.

The spring 32 is put between the lower side of the seat cushion 8 and the lower cover 9 so as to be compressed. The spring 32 gives an upward force to the front portion of the seat cushion 8.

The stopper mechanism 33 has a similar constitution as the stopper mechanism 23 of the third embodiment. The stopper mechanism 33 essentially consists of a stopper 33A and a solenoid 33B. The solenoid 33B retracts the stopper 33A when current is switched ON, and ejects the stopper 33A when the current is switched OFF.

An end portion of the stopper 33A is engaged with an outer side of the node of the first link 31A and the second link 31B to hold the linkage 31 to expand as shown in FIG. 11A when the stopper 33A is ejected. The linkage 31 can shrink so that the seat cushion 9 can be pressed down when the stopper 33A is retracted.

The stopper 33A is provided so as not to engaged with an inner side of the node of the first link 31A and the second link 31B when the linkage 31 shrinks.

A buckle switch of the fourth embodiment (not shown in the drawings) is also operated by the seat belt in the same way as the third embodiment.

According to the car seat 1b of the fourth embodiment, the front portion of the seat cushion 8 is lifted by the force of the spring 32 as shown in FIG. 11A and the stopper 33A is engaged with the outer side of the node of the first link 31A and the second link 31B to hold the linkage 31 to expand before the occupant takes the seat.

If the occupant might switch the ignition switch ON though the seat belt was not buckled, the stopper 33A was kept engaging with the outer side of the node so as to give warning to the occupant.

He has to buckle the seat belt to get a normal seating position. When he buckles the seat belt so that the buckle switch is OFF and the stopper 33A is retracted, he can press the seat cushion 8 downward with his femoral regions so that the seat cushion 8 recovers to a regular position.

The contents of Japanese Patent Application No.2002-350286 (filed on Dec. 2, 2002) are incorporated herein by reference in its entirety.

Although the invention has been described above by reference to certain embodiments of the invention, the invention is not limited to the embodiments described above. Modifications and variations of the embodiments described above will occur to those skilled in the art, in light of the above teachings. For example, the warning means is not limited as the headrest forward tilting mechanism 10 or the cushion cushion lifting mechanisms 20, 30. Any local pressure means for pressing an occupant's back and such are available.

What is claimed is:

1. A car seat comprising:

a detector detecting whether a seat belt is buckled or unbuckled; and a deformation mechanism for partial deformation of the car seat, the partial deformation being held when an ignition switch of a car engine is switched on and the detector detects the seat belt is unbuckled, and the partial deformation being cancelled when the detector detects the seat belt is buckled.

2. The car seat of claim 1, wherein the deformation mechanism comprises a headrest tilting mechanism for tilting a headrest of the car seat.

3. The car seat of claim 2, wherein the headrest tilting mechanism tilts the headrest forward.

4. The car seat of claim 2, wherein the headrest tilting mechanism tilts the headrest rearward.

5. The car seat of claim 2, wherein the headrest tilting mechanism comprises a support portion for supporting the headrest so as to be able to tilt, a spring for applying a force to the headrest to be tilted and a stopper mechanism for holding and canceling the headrest being tilted.

6. The car seat of claim 5, further comprising a core member for supporting the headrest, wherein the support portion is rotatably fit around the core member, the spring is inserted between the support portion and the core member and the core member, the spring and the support portion are housed in the headrest.

7. The car seat of claim 1, wherein the deformation mechanism is a cushion lifting mechanism for lifting a front portion of a seat cushion of the car seat upward.

8. The car seat of claim 7, wherein the cushion lifting mechanism comprises a swinging member for supporting the front portion of the seat cushion so as to be able to lift upward, a spring for applying a force to the swinging member to be lifted upward and a stopper mechanism for holding and canceling the cushion being lifted upward.

9. The car seat of claim 7, wherein the cushion lifting mechanism comprises a linkage for supporting the front portion of the seat cushion so as to be able to lift upward, a spring for applying a force to the front portion of the seat cushion to be lifted upward and a stopper mechanism for holding and canceling the cushion lifting mechanism.

* * * * *